Patented Feb. 4, 1941

2,230,648

UNITED STATES PATENT OFFICE 2,230,648

CONVERSION OF HYDROCARBONS

Edwin T. Layng, Jersey City, N. J., assignor to The Polymerization Process Corporation, Jersey City, N. J., a corporation of Delaware No Drawing. Application June 1, 1939,
Serial No. 276,812

7 Claims. (Cl. 196—10)

This invention relates to the conversion of olefinic hydrocarbons to hydrocarbons of higher boiling points. More particularly, the invention relates to the conversion of low-boiling olefinic hydrocarbons to hydrocarbons of higher boiling points to produce a motor fuel of high anti-knock value, and an improved catalytic contact material for promoting said conversion.

It has been suggested to effect conversion of olefinic hydrocarbons to higher boiling hydrocarbons by polymerization thereof in contact with a catalyst consisting of acids of pentavalent phosphorus as such or in the form of free acid in solid bodies made by treating a solid material such as diatomaceous earth with a phosphoric acid. It has also been suggested to employ certain metal orthophosphates in admixture with orthophosphoric acid in a catalyst containing varying proportions of free orthophosphoric acid.

In connection with the present invention it has been discovered that superior results in the polymerization of olefinic hydrocarbons may be obtained by the use of a catalytic material or contact agent in which mercury pyrophosphate is an essential ingredient.

Any suitable method may be used for the preparation of the mercury pyrophosphate but it has been found that the preparation may be effected conveniently by the formation of the mercury pyrophosphate directly by metathesis. A suitable mercury salt and a soluble pyrophosphate such as sodium pyrophosphate may be reacted in solution to effect precipitation of mercury pyrophosphate. For example, a 0.2 molar solution of sodium pyrophosphate may be added to a 0.2 molar solution of a mercury salt such as mercuric acetate or mercuric nitrate. Addition is carried out gradually, and the reaction mixture is stirred during the addition. Specifically, a sodium pyrophosphate solution made by dissolving 112 grams of sodium pyrophosphate decahydrate in 1250 cc. of water may be added to a solution made by dissolving 160 grams of mercuric acetate, or 162 grams of mercuric nitrate in 2500 cc. of water, during a period of about one-half hour. The precipitate is filtered off, washed thoroughly with water, dried and formed into pellets as desired for use in the polymerization reactor. The material thus prepared contains no free phosphoric acids.

It is to be understood that the above example merely illustrates one method of preparing satisfactory catalytic material in a convenient manner, and that mercury pyrophosphate prepared by other methods may be employed within the scope of the invention.

While mercury pyrophosphate may be employed as such a catalyst for the polymerization reaction it may be used in admixture with other active or inactive ingredients, for example, pyrophosphates of certain metals other than mercury such as copper, zinc, magnesium, iron, cobalt and aluminum. Where other pyrophosphates are used these may be co-precipitated with the mercury pyrophosphate or separately prepared and thereafter mixed with the mercury pyrophosphate.

In carrying out the present invention the olefinic hydrocarbons or the mixture of hydrocarbons containing olefinic constituents are passed in contact with the catalyst in a suitable chamber or reactor, the reaction gases being suitably preheated for the reaction. Any suitable pressure may be used but it is preferable to employ relatively high pressures, for example, in excess of 150 pounds per square inch although the catalytic material exhibits its polymerization activity at atmospheric pressure or below. As is well known to those skilled in the art, the rate of polymerization of olefinic hydrocarbons is a function of the concentration of these materials and accordingly, from economic considerations such reactions are best run at superatmospheric pressure.

The optimum operating temperature will depend somewhat upon the nature of the material under treatment and the product desired. For example, for the conversion of gaseous olefins such as butylenes a temperature of approximately 300° to 400° F. is advantageous for effecting maximum conversion to a product consisting essentially of gasoline motor fuel constituents.

The extent of reaction and the character of the liquid product are effected also by the length of time during which the charge remains in contact with the catalyst under the operating conditions, that is, the space velocity of the charge. In general the charge is passed over the catalyst at a rate of from 2 to 40 or more cubic feet of charge, measured as gas at standard conditions of temperature and pressure, per pound of catalytic material per hour.

It is apparent that with any given charge the extent of reaction and the character of the product depend mainly upon the operating pressure, the operating temperature and the space velocity of the charge. It is apparent that many combinations of these variables will yield the desired amount and quality of product, but by reference to the accompanying general description and the specific example those skilled in this art will be able to select satisfactory conditions for producing a desired result, without undue experimentation.

The invention will be illustrated by the following example of the use of the improved catalytic material of the present invention in the polymerization of gaseous olefins to normally liquid products. It is to be understood, however, that the invention is not limited by such specific example of the use of the catalytic material for polymerizing gaseous olefins but is of wider scope in that the catalytic material may be employed also for the polymerization of normally liquid olefins to higher boiling products.

Mercury pyrophosphate, prepared as described above, and formed into ⅛ inch pellets was used as a catalytic contact agent in the conversion treatment of a gaseous mixture containing 27 volume per cent normal butylene and 16 volume per cent isobutylene. The gas was passed over the catalyst as a stream at a temperature of 325° to 375° F. under pressure of 1400 pounds per square inch. The gas was passed through the chamber containing the catalyst at a rate of 32 to 38 cubic feet, measured as gas at standard conditions of temperature and pressure, per pound of catalytic material per hour. Over a test period of 80 hours duration the conversion of olefins to liquid products was effected at a substantially uniform rate, the liquid polymer yield being 22 to 27 per cent by weight based on the charge. This represented a 60 per cent convesion of the olefins charged.

If even more complete conversion of the olefins present had been desired in connection with the operation described above this could have been accomplished by changing one or more of the variables of temperature, pressure and space velocity discussed previously. In the operation described above this could be accomplished conveniently by raising the operating temperature slightly, for example, to 375° to 400° F. or by reducing the space velocity slightly, or both.

As mentioned above, the extent of conversion is affected by the above-mentioned variables of temperature, pressure and space velocity. The character of the liquid product is affected also by these variables in respect to its boiling point and in respect to its octane number. For example, it may be desirable to limit the extent of conversion obtained in order to obtain a product of the desired octane number. The effect of the extent of conversion on the octane number of the product is particularly noticeable in connection with the treatment of gaseous mixtures containing both normal butylenes and isobutylene. For example, in the treatment of a mixture of normal and isobutylenes by means of the new catalytic material at a temperature such as that mentioned above it is found that conversion of the isobutylene proceeds more rapidly than conversion of the normal butylenes whereby by limiting the time of contact of the charge with the catalytic material to a predetermined figure it is possible to effect preferential conversion of the isobutylene and thus obtain a product of higher octane number.

The moisture content of the reaction gas mixture apparently has no direct effect on the reaction. However, in order to avoid a possible softening effect on the catalyst pellets with resulting possible pressure drop increases in the reaction chamber and similar operating difficulties it may be desirable that the reaction gas be substantially dry.

Certain other metal pyrophosphates such as those of copper, zinc, magnesium, iron, cobalt and aluminum are also more or less useful to promote the polymerization of olefins. It is found, however, that in the use of these other metal pyrophosphates the reaction gases must be passed over the catalyst for some time at elevated temperature before the conversion to higher boiling products is initiated. It is believed that the pyrophosphates are thus activated through the formation therein of an active modification which probably occurs as a reduction product of the pyrophosphate although it is to be understood that the invention here is not to be limited by any theory regarding the mechanism of activation of these pyrophosphates. After initiation of reduction to the active modification by prolonged heating at elevated temperature in the presence of the reaction gases it is found that reduction continues, apparently because the reduction products originally formed act as nuclei to promote the reduction of additional material. The progressive release of the active modification in this manner is of advantage because the latter is gradually rendered inactive. In order to maintain constant activity fresh supplies of the active modification must be produced at a rate at least as rapid as that at which it is rendered inactive. However, too rapid reduction may result in rapid loss of strength and relatively short life of the catalytic material so that it may be advantageous to prepare the pyrophosphate in a manner by which the pyrophosphate is somewhat stabilized against reduction. Under these conditions reduction is initiated only after an even longer period of heating in the presence of the reaction gases and continues gradually and at a slower rate than would be the case if the material were not so stabilized. For example, certain of the above-mentioned metal pyrophosphates may be stabilized by the adsorption or occlusion therein of a double salt of the soluble metal pyrophosphate employed as a precipitant and the metal pyrophosphate desired as catalytic material. The formation of the double salt may be effected by employing an excess of the soluble pyrophosphate over the amount which is stoichiometrically equivalent to the metal salt which it is desired to convert to the metal pyrophosphate catalytic material. For example, copper pyrophosphate may be prepared in a manner similar to the method given above for the preparation of mercury pyrophosphate by the reaction of a copper salt such as copper acetate or copper sulfate with sodium pyrophosphate, sodium pyrophosphate being employed in an amount which is 10 per cent in excess of the amount equivalent to the copper salt in accordance with the reaction

$$2CuSO_4 + Na_4P_2O_7 \longrightarrow Cu_2P_2O_7 \downarrow + 2Na_2SO_4$$

Under these conditions there will be formed a double salt of sodium pyrophosphate and copper pyrophosphate which acts to stabilize the remaining copper pyrophosphate against reduction to the active modification.

In contradistinction to the activation or induction period necessary for the above discussed pyrophosphates of metals other than mercury, it is found that in the use of mercury pyrophosphate, for promoting olefin polymerization, activity is initiated relatively promptly. It may be that mercury pyrophosphate per se acts as the catalyst or it may be that it is activated through the formation of an active modification analogous to the manner discussed above in connection with the other metal pyrophosphates. However, if the latter is the case it is apparent that reduction occurs relatively rapidly.

On the other hand, certain of the other active metal pyrophosphates discussed above are less expensive than mercury pyrophosphate. For example, copper pyrophosphate is a much cheaper catalytic material, and after activation it is capable of promoting conversion at a rate comparable to that described above in connection with the use of mercury pyrophosphate.

A modification of the present invention therefore consists of the use of a catalytic material comprising a mixture of mercury pyrophosphate with another metal pyrophosphate which is capable of reduction to a modification which is a catalyst for olefin polymerization. As a further improvement the said other metal pyrophosphate may be stabilized against reduction by the incorporation therein of an inhibitor such as the above-mentioned double salt or by other means. This composite catalytic material has the advantage that the mercury pyrophosphate ingredient thereof renders it active so that conversion of olefins is initiated relatively promptly at the reaction temperature and continues at least until initiation of reduction of the other metal pyrophosphates is effected. In its preferred form the composite catalytic material of the present invention comprises a mechanical mixture of mercury pyrophosphate and copper pyrophosphate although other suitable metal pyrophosphates may be employed instead of or in addition to copper pyrophosphate. The mercury and copper pyrophosphates may be coprecipitated or may be precipitated in separate solutions and admixed mechanically. If it is desired to stabilize the copper pyrophosphate by inclusion therein of the double salt it may be desirable to effect precipitation of the pyrophosphates in separate solutions although this is not necessary. The pyrophosphates, together with any desired supporting material, may be formed into pellets separately after which the salts are admixed mechanically, or the pyrophosphates together with any desired supporting material may be admixed and thereafter formed into pellets.

The employment of the catalytic material of the invention in the conversion of olefins is advantageous in that it permits a large production of polymers per unit cost of catalytic material. The catalyst employed in the process is very stable and is less susceptible to deactivation during use than other catalysts of similar activity employed heretofore.

I claim:

1. The method of converting olefinic hydrocarbons to hydrocarbons of higher boiling points by polymerization thereof which comprises contacting said olefinic hydrocarbons at elevated temperature with catalytic material comprising as an essential ingredient mercury pyrophosphate.

2. The method of converting olefinic hydrocarbons to hydrocarbons of higher boiling points which comprises contacting said olefinic hydrocarbons with mercury pyrophosphate under conditions of temperature, pressure and time suitable to effect said conversion.

3. The method of treating a mixture of hydrocarbons comprising both normal olefins and iso-olefins to effect conversion of a portion thereof to hydrocarbons of higher boiling points which comprises contacting said mixture of hydrocarbons at elevated temperature with a catalytic contact agent comprising as an essential ingredient mercury pyrophosphate, and limiting the extent of conversion of said hydrocarbons to higher boiling products to effect preferential conversion of iso-olefins.

4. The method of treating a mixture of hydrocarbons comprising normal butylenes and iso butylene to effect polymerization of a portion of said butylenes to products within the gasoline boiling range which comprises contacting said hydrocarbon mixture at elevated temperature with a catalytic contact agent comprising as an essential ingredient mercury pyrophosphate, and limiting the extent of conversion of said butylenes to effect preferential conversion of said iso butylene.

5. The method of converting olefinic hydrocarbons to hydrocarbons of higher boiling points which comprises contacting said olefinic hydrocarbons at elevated temperature with a catalytic contact agent comprising a mixture of mercury pyrophosphate and a second metal pyrophosphate selected from the group consisting of pyrophosphates of copper, zinc, magnesium, iron, cobalt and aluminum.

6. The method of converting olefinic hydrocarbons to hydrocarbons of higher boiling points which comprises contacting said olefinic hydrocarbons at elevated temperature with catalytic contact material comprising a mixture of mercury pyrophosphate and copper pyrophosphate.

7. The method of claim 6 wherein at least a portion of said copper pyrophosphate is stabilized by having associated therewith a double salt of copper pyrophosphate and a soluble pyrophosphate whereby said stabilized portion of the copper pyrophosphate is less easily reduced than said mercury pyrophosphate or unstabilized copper pyrophosphate.

EDWIN T. LAYNG.